INVENTORS
ANTHONY A. SHERIDAN
RUDOLPH W. MILLER
ATTYS.

United States Patent Office 3,395,569
Patented Aug. 6, 1968

3,395,569
DYNAMIC CURVATURE SENSING AND MEASURING DEVICE
Anthony A. Sheridan, 1007 Sharon Drive, Glen Burnie, Md. 21061, and Rudolph W. Miller, 824 Chester Ave., Annapolis, Md. 21403
Filed July 30, 1965, Ser. No. 476,212
4 Claims. (Cl. 73—35)

ABSTRACT OF THE DISCLOSURE

This disclosure relates to a piezosensitive device, preferably piezoelectric, for detecting dynamic curvature or distortion of a structure member. The signal generated by the first piezoelectric element, which is in response to the acceleration and the deflection of the element, is vectorially combined with the signal generated by the second piezoelectric element which is only in response to the acceleration of the device. Thus, the total output signal is indicative purely of dynamic distortion.

---

The invention described herein may be manufactured and used by or for the Government of the United States of America for governmental purposes without the payment of any royalties thereon or therefor.

This invention relates to piezosensitive devices and more particularly to piezosensitive devices suitable for detecting dynamic curvature or distortion of a structural member, for example as a result of explosive forces.

Heretofore the measurement of dynamic curvature or distortion of a structural member through the use of piezoelectric strain gauge means has been subject to inaccuracies introduced by the strain gauge itself acting in the nature of an accelerometer in response to the dynamic movements imparting the distortion sought to be measured.

It is a primary object of this invention to provide improved strain gauge means for accurately measuring or detecting dynamic curvature or distortion of a structural member irrespective of acceleration forces imparted to the strain gauge means in effecting the dynamic distortion being measured.

Another object of this invention is the provision of piezosensitive means capable of detecting or measuring dynamic distortion of a structural element while also detecting acceleration thereof as a result of forces producing the dynamic distortion.

As another object this invention aims to accomplish the foregoing through the provision of a first piezosensitive, preferably piezoelectric, element supported by means for effecting distortions of the element corresponding to distortions and accelerations in a test member, and a second piezosensitive element supported so as to be subject only to the accelerations of the test member, whereby the outputs of the first and second elements may be combined in a sense to provide an output indicative purely of dynamic distortion.

Figure 1:
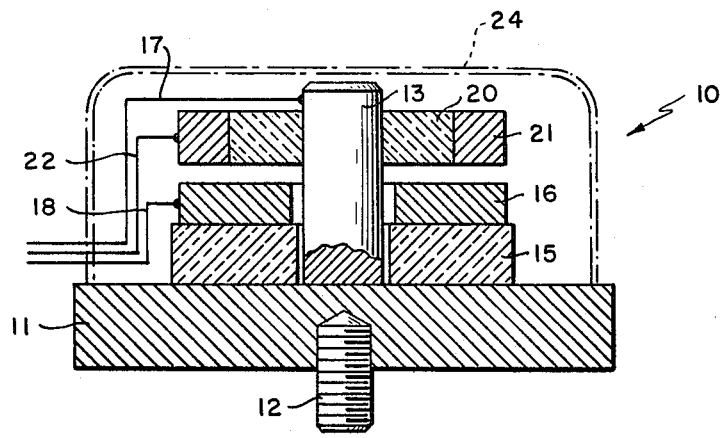
Figure 2:
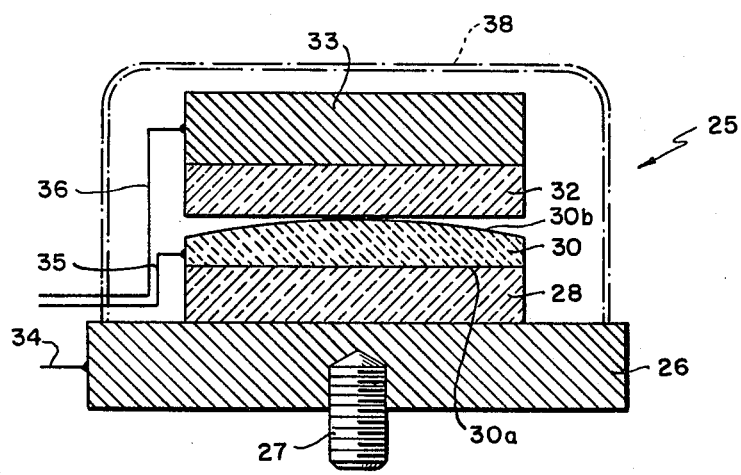

Other objects and many of the attendant advantages of this invention will be readily appreciated as the same becomes better understood by reference to the following detailed description when considered in connection with the accompanying drawings wherein:

FIG. 1 is a vertical sectional view of a dynamic distortion sensing device embodying the present invention; and FIG. 2 is a vertical sectional view of another form of dynamic distortion sensing device embodying the invention.

In the form of the invention illustrated in FIG. 1 and described hereinafter, there is provided an improved dynamic curvature sensing device generally indicated at 10.

The device 10 comprises a metal base plate 11 which in this example is circular and has a centrally located stud 12 extending from one side thereof for attachment of the device to a structural member (not shown) to be tested as by subjection to explosive forces or the like which will produce dynamic curvature in the test member. The base plate 11, when so connected to a structural test member, will itself undergo dynamic curvature corresponding to that of the test member. Extending from the base plate 11 on the side thereof opposite the stud 12 is a metal support post 13 the purpose of which will become apparent as the description proceeds.

Mounted on the plate 11 is a disk shaped piezosensitive element 15 having a central opening 15a through which the post 13 freely extends. In this example the element 15 is preferably in the form of a piezoelectric crystal or piezoelectric ceramic material. An annular member, which will be referred to hereinafter as mass 16, is mounted on the element 15 on the side thereof opposite the base plate 11. The mass 16 and the base plate 11 may conveniently serve as electrodes for the piezoelectric element 15 and for this purpose suitable wires 17 and 18 may be connected to the post 13 and the mass 16, the post 13 being electrically continuous with the base plate.

The element 15 is fixed to the base plate 11 so as to follow bending movement thereof and to produce across wires 17 and 18 an electrical signal or output related to dynamic curving or bending distortions of a test member to which the device 10 is secured.

In the event that the movements of the test member producing bending in the base plate 11 also produce in the device 10 acceleration having components axial of the post 13, a portion of the electrical output derived from the element 15 will be attributable to piezoelectric response of the element to such acceleration components. Accordingly, the electrical output from the element 15 is dualistic in nature in that part of the voltage output is proportional to dynamic curvature and part is proportional to acceleration. The mass 16 increases the response of the piezoelectric element 15 to acceleration and the part of the electrical output resulting from acceleration can be readily calibrated by subjecting the device to known accelerating forces without subjecting the element 15 to bending forces. Inasmuch as the acceleration and dynamic curvature produced voltages appear together as a single output voltage, the use of a piezoelectric element 15 without additional structure such as described hereinafter would provide signals which would be inaccurate as true representations of dynamic curvature in a test member.

Mounted at the free end of the post 13 in spaced relation to the element 15 is a second disk shaped piezosensitive element in the form of an annular piezoelectric crystal or ceramic element 20, to the periphery of which is fixed an annular member or mass 21. The mass 21 may conveniently serve as one electrode for the element 20 and is provided with a wire 2, the post 13 serving as the other electrode. Because the post 13 engages only a minor central area of the piezoelectric element 20, that element is isolated by the post 13 from bending movements of the base plate 11 as it follows dynamic curvatures of a test member, but is subjected to accelerations transmitted by the post 13 from the center of the plate. Accordingly, the piezoelectric element 20 provides an output voltage across wires 22 and 17 which is singular in character in that it is related only to accelerations of the test member and plate 11 but not to the bending strain of dynamic curvature thereof.

Inasmuch as the piezoelectric element 15 is sensitive to both acceleration and dynamic curvature while the other piezoelectric element 20 is sensitive only to acceleration, if the device 16 is subjected to motion of a test member and the two elements 15 and 20 give like voltage outputs, then no bending is present in the test member. However, if the voltage outputs of the elements 15 and 20 differ, then bending or dynamic curvature is present in the test member. The output of the device 10 is conveniently taken as the algebraic difference between the output voltages of the elements 15 and 20 which may be so selected as to provide zero output for the device 10 when no bending is present. This may be done, for example, by connecting the elements 15 and 20 in series and oriented so that voltage signals generated thereby in response to acceleration oppose one another. The device 10 is therefore particularly useful as a structural bending or dynamic curvature detector and obviates the need for separate measuring of strain and acceleration as required heretofore, and overcomes the errors introduced by the dualistic nature of the output of a single piezosensitive element when subjected to dynamic curvature.

Of course the components of the device 10 may be suitably protected as by a cup-shaped housing or cover member 24 illustrated in phantom in FIG. 1.

Referring now to FIG. 2, there is illustrated another embodiment of the invention in the form of a dynamic curvature sensing device generally indicated at 25. The device 25 comprises a base plate 26 having a central mounting stud 27 and on which plate is fixed a piezoelectric element 28 preferably in the form of a piezoelectric crystal or ceramic disk.

Mounted on the piezosensitive element 28, on the side thereof opposite the base plate 26 is a bending decoupler in the form of a metal or piezoelectrically inert ceramic member 30 having one surface 30a in substantially full engagement with the piezoelectric element 28. The opposite surface 30b of the decoupler member 30 is convexly curved so as to have only a minor central area in engagement with an acceleration responsive piezosensitive element 32 which is preferably in the form of a piezoelectric crystal or ceramic disk.

Mounted on the opposite side of the element 32 from the decoupling member 30 is a member which will be referred to as a mass 33. In this embodiment the mass 33 affects the response of each of the elements 32 and 28 to accelerations.

The response of the element 28 to bending and acceleration may be taken as a voltage output across wires 34, 35 connected to the decoupler member 30 and base plate 26, respectively, acting as electrodes. In this regard, if the decoupler member 30 is ceramic it may have its surfaces conductively coated so as to perform as an electrode. The response of the element 32 to acceleration may be taken as a voltage output across a wire 36 connected to mass 33 and the wire 35. As in the prior example, if the outputs of the two piezoelectric elements are alike, then no structural bending or dynamic curvature is present, but if the outputs thereof are not alike, then dynamic curvature is present. The components of the device 25 may be suitable protected as by a cup-shaped housing or cover 38 illustrated in phantom in FIG. 2.

Obviously many modifications and variations of the present invention are possible in the light of the above teachings. It is therefore to be understood that within the scope of the appended claims the invention may be practiced otherwise than as specifically described.

What is claimed is:

1. A device for sensing dynamic curvature in a test member, said device comprising:
    a first piezoelectric disk having a central opening;
    plate means engaging one side of said first piezoelectric disk for mounting thereof on a test member for moving and flexing therewith, said first piezoelectric disk thereby being responsive both to dynamic curvature and to acceleration of the test member;
    a second piezoelectric disk disposed coaxially with said first piezoelectric disk;
    bending decoupler means supporting said second piezoelectric disk in spaced relation to the said first piezoelectric disk for simultaneous response therewith to acceleration of the test member, said decoupler means being operative to isolate said second piezoelectric disk from bending movements of the test member and of said first piezoelectric disk, said decoupler means further comprising a post extending from said plate means through said opening and engaging a minor central portion of the said second piezoelectric disk;
    means for making electrical connection with said first and second piezoelectric disks and for electrically and algebraically combining the voltage outputs thereof; and
    mass means cooperable with said disks for increasing the responses thereof to acceleration of the test member.

2. A device as defined in claim 1 and wherein said mass means comprises:
    a first annular mass member surrounding said post and engaging said first piezoelectric disk on the side thereof opposite said plate means; and
    a second annular mass member fixed to the periphery of said second piezoelectric disk.

3. A device for sensing dynamic curvature in a test member, said device comprising:
    a first piezoelectric disk;
    plate means engaging one side of said first piezoelectric disk for mounting thereof on a test member for moving and flexing therewith, said first piezoelectric disk thereby being responsive both to the dynamic curvature and to the acceleration of the test member;
    a second piezoelectric disk dispose coaxially with said first piezoelectric disk;
    bending decoupler means supporting said second piezoelectric disk in spaced relation to said first piezoelectric disk for simultaneous response therewith to acceleration of the test member, said decoupler means being operative to isolate said second piezoelectric disk bending movements of the test member and of said first piezoelectric disk;
    said decoupler means further comprising a piezoelectrically inert member having a first surface in substantially full engagement with said first piezoelectric disk on the side thereof opposite said plate means, said inert member having a convex surface making engagement with only a minor central portion of one side of said second piezoelectric disk;
    means for making electrical connection with said first and second piezoelectric disks and for electrically algebraically combining the voltage output thereof; and
    mass means cooperable with said disks for increasing the responses thereof to acceleration of the test member.

4. A device as defined in claim 3 and wherein said mass means comprises a mass member mounted on said second piezoelectric disk.

References Cited

UNITED STATES PATENTS

| | | | |
|---|---|---|---|
| 2,250,496 | 7/1941 | Postlethwaite | 310—8.3 XR |
| 2,885,891 | 5/1959 | Wilson et al. | 73—88.5 XR |
| 3,187,300 | 6/1965 | Brate. | |
| 3,307,054 | 2/1967 | Shoor | 310—8.4 |

JAMES J. GILL, *Primary Examiner.*